US008428791B2

(12) United States Patent
Carlsson

(10) Patent No.: US 8,428,791 B2
(45) Date of Patent: Apr. 23, 2013

(54) CONTROL SYSTEM FOR A REMOTE CONTROL WORK MACHINE

(75) Inventor: Martin Carlsson, Göteborg (SE)

(73) Assignee: Husqvarna AB, Huskvarna (SE)

( * ) Notice: Subject to any disclaimer, the term of this patent is extended or adjusted under 35 U.S.C. 154(b) by 26 days.

(21) Appl. No.: 13/145,536

(22) PCT Filed: Jan. 20, 2009

(86) PCT No.: PCT/SE2009/050054

§ 371 (c)(1), (2), (4) Date: Jul. 20, 2011

(87) PCT Pub. No.: WO2010/085184

PCT Pub. Date: Jul. 29, 2010

(65) Prior Publication Data

US 2011/0282519 A1 Nov. 17, 2011

(51) Int. Cl.
*G06F 7/00* (2006.01)

(52) U.S. Cl.
USPC .............................................................. 701/2

(58) Field of Classification Search ................ 701/2, 36, 701/50, 538, 541
See application file for complete search history.

(56) References Cited

U.S. PATENT DOCUMENTS 6,836,982 B1 1/2005 Augustine
2001/0035303 A1 11/2001 Chatterjea
2003/0147727 A1* 8/2003 Fujishima et al. ............ 414/200
2006/0007144 A1 1/2006 Mathiasen et al.
2006/0271263 A1* 11/2006 Self et al. ........................ 701/50
2009/0198414 A1* 8/2009 Mohning et al. ................ 701/41

FOREIGN PATENT DOCUMENTS

| | | | |
|---|---|---|---|
| EP | 0857640 | A2 | 8/1998 |
| GB | 2344571 | A | 6/2000 |
| JP | 11269938 | A | 10/1999 |
| JP | 2002002521 | A | 1/2002 |
| JP | 2003099124 | A | 4/2003 |

OTHER PUBLICATIONS

International Preliminary Report on Patentability, International Application No. PCT/SE2009/050054, May 26, 2011.

International Search Report, International Application No. PCT/SE2009/050054, Sep. 29, 2009.

* cited by examiner

*Primary Examiner* — Kim T Nguyen

(74) *Attorney, Agent, or Firm* — Novak Druce Connolly Bove + Quigg LLP

(57) ABSTRACT

Control system for a remote-controlled working machine provided with tracks, the control system including a remote control, the remote control being connected wirelessly or by a cable to at least one electronic unit in the machine, and having at least one control stick or joystick and a number of buttons, levers and/or knobs for operating the different travel and working functions of the machine. The machine furthermore has one or more different setting modes or positions, wherein its control sticks and/or certain buttons have different functions in different modes.

10 Claims, 5 Drawing Sheets

Transport position

Right track forwards
left track backwards

Right track backwards
left track forwards

Rotate tower clockwise
Rotate tower anti-clockwise

Caterpillar tracks forwards

Caterpillar tracks backwards

CONTROL SYSTEM FOR A REMOTE CONTROL WORK MACHINE

TECHNICAL FIELD

The invention relates to a control system for a remote-controlled working machine provided with caterpillar tracks for the travel thereof, e.g. a demolition robot intended for demolition work, etc., the said control system including a remote control intended to be carried by an operator situated beside the machine, the said remote control being connected by means of Bluetooth, wirelessly or by means of a cable to an electronic unit in the machine, and having at least two control sticks or joysticks and a number of buttons and/or knobs for operating the different travel and working functions of the machine. The machine furthermore has one or more different setting modes or positions, wherein its control sticks and/or certain buttons have different functions in different modes.

BACKGROUND OF THE INVENTION

Machines referred to as demolition robots are remote-controlled working machines intended for different demolition operations, in which the operator walks beside the machine and controls its different movements. He does this using a remote control which he straps on so that it sits in front of his stomach at a suitable working height. The remote control has two control sticks and a series of different buttons and knobs. The machine is used in several different working modes. It is first moved up to the working surface, e.g. a wall, to be demolished. Its support legs are then lowered so that the machine stands steady. This is a set-up mode. The actual demolition work then begins in a work mode. So that it is possible to execute a plurality of different movements with only two control sticks, the control sticks are given different functions in the different working modes. In a known type of machine referred to as Brock, travel or transport is effected by pressing a button on each control stick. The machine then goes forwards or backwards at a fixed speed. The operator therefore has to use both hands and, in order to be able to turn, he has to change the work mode to a mode allowing for turning. As the machine is electrically driven, a power cable has to be connected to the mains and the machine thus trails the cable behind it during travel. One problem is that the power cable may become jammed under the machine or become entangled with an object in the vicinity. When this begins to happen, the operator has to let go of at least one control stick and therefore interrupt travel in order then to straighten the cable and continue travel. This is a slow and inefficient way of working. Furthermore, both hands are used for the travel operation so that he cannot simultaneously operate the rotating tower of the machine or any other part that has to be rotated during travel. Instead, travel also has to be interrupted in this case.

SUMMARY OF THE INVENTION

The aim of this invention is to provide a control system for a remote-controlled working machine which remedies or substantially reduces the abovementioned problems. This is effected in that, in a travel mode, also referred to as a transport position, travel of the machine is effected entirely by one control stick (12, 13), advantageously the left control stick (12), such that the caterpillar tracks (6) of the machine are operated as follows:

- if the control stick is moved forwards or backwards, both caterpillar tracks (6) are driven forwards or backwards so that the machine moves forwards or backwards;
- if the control stick is moved straight to the left, the right caterpillar track is driven forwards and the left caterpillar track is driven backwards so that the machine turns to the left;
- if the control stick is moved straight to the right, the left caterpillar track (6) is driven forwards and the right caterpillar track is driven backwards so that the machine turns to the right;
- if the control stick is moved in a diagonal direction forwards or backwards and to the side, the abovementioned movements are combined so that the machine both turns and goes forwards or backwards.

The operator's other hand is thus free for other tasks during travel of the machine.

The control system is advantageously also designed in such a manner that the extent of the deviation of the control stick from its centre position determines how quickly the caterpillar tracks (6) are driven, such that a small deviation results in slow movement of the machine and a large deviation results in faster movement of the machine. This means that the machine can be fully operated using only one control stick, i.e. one hand.

Each control stick is furthermore advantageously provided with a first control member, also referred to as the left button, which, when activated, gives the control stick a different function from its basic function. A second or possibly a third or fourth control member may also be provided at least on one control stick. The control stick can control several different functions by means of these control members, which is of course an advantage.

Other features and advantages will be clear from the detailed description of preferred embodiments with reference to the accompanying drawings.

BRIEF DESCRIPTION OF THE DRAWINGS

This invention will now be described with reference to the accompanying drawings showing preferred embodiments of the invention.

DETAILED DESCRIPTION OF PREFERRED EMBODIMENTS

Figure 1:
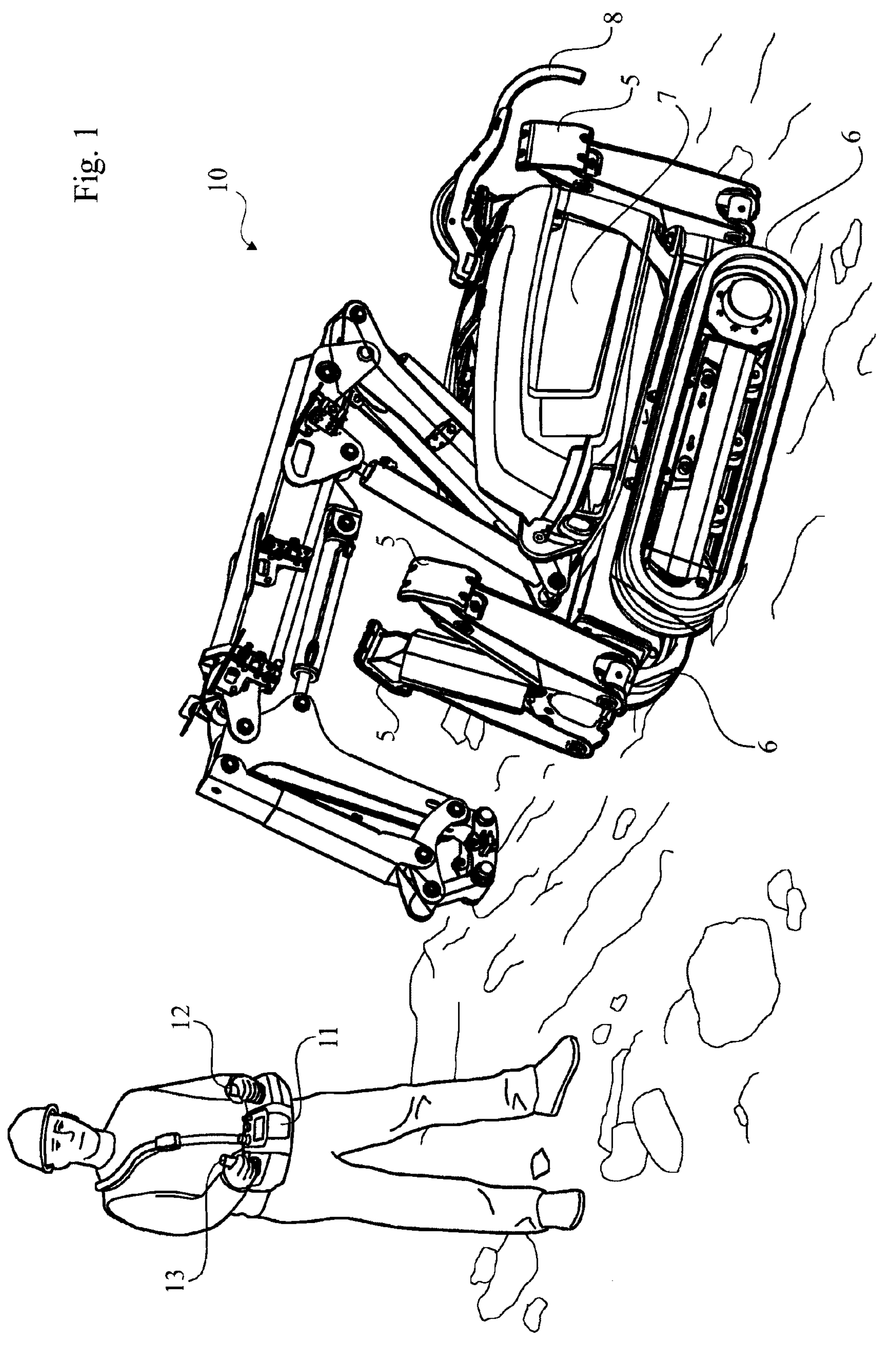
FIG. 1 is a perspective view showing an operator using a remote control to operate a working machine according to the invention during travel.
Figure 2:
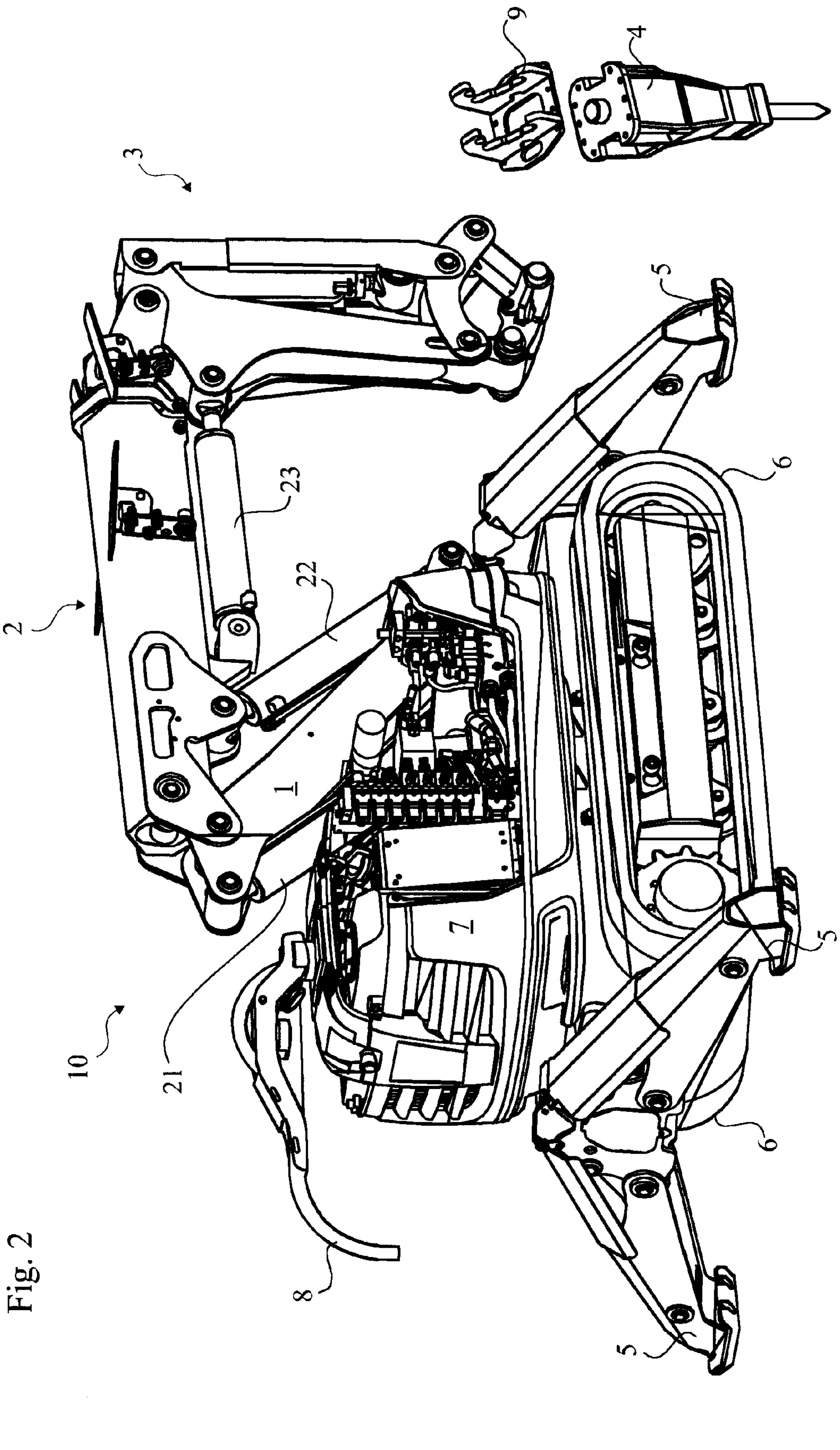
FIG. 2 is an oblique rear perspective view of a working machine with protective casings removed and the support legs lowered.

With reference to FIG. 1, it shows a working machine 10. It is a demolition robot which is electrically driven and which has a power cable 8. In the figures, the cable 8 is shown in a detached state, but it is in fact connected to a cable leading to a socket, generally for high-tension current. The machine is driven by caterpillar tracks 6 and has a rotating tower 7. An arm consisting of several parts, which will be described in more detail with reference to FIG. 2, is secured to the tower. The arm has no demolition tool mounted thereon. The machine has four support legs 5 which are in this case fully raised. The operator operates the machine with the aid of a remote control 11 which is in this case worn over the operator's shoulders. However, it may of course also be secured in a different manner, e.g. by means of a waist belt. The remote control has a left control stick 12 and a right control stick 13.

FIG. 2 shows a demolition machine in more detail with some of the protective casings removed. Its support legs 5 are lowered so that the machine rests steady on its four support legs. As mentioned, the machine has an arm consisting of three parts. Arm 1 is hinged to the rotating tower 7 of the machine and can be swung with the aid of a hydraulic cylinder 21 the upper end of which is seen in the left part of the arm. Arm 2 is secured to arm 1. It is inclined with the aid of a hydraulic cylinder 22 on the front side of arm 1. Arm 2 also has an inner telescopically extendable part which increases the range of the machine. It is operated by a hydraulic cylinder which is placed within arm 2 and is therefore completely concealed. Arm 3 is secured to the outer end of arm 2. It is swung by a hydraulic cylinder 23 on the inside of arm 2. The outer end of arm 3 is designed in such a manner that it can be secured to a mounting plate 9 mounted on the rear side of a demolition tool 4. For the sake of clarity, the tool 4 and the mounting plate 9 are shown separated from one another and from the outer end of the arm 3. The tool shown is a hammer for chipping concrete or the like. It can be exchanged for a concrete cutter for breaking and cutting material.

Figure 3:
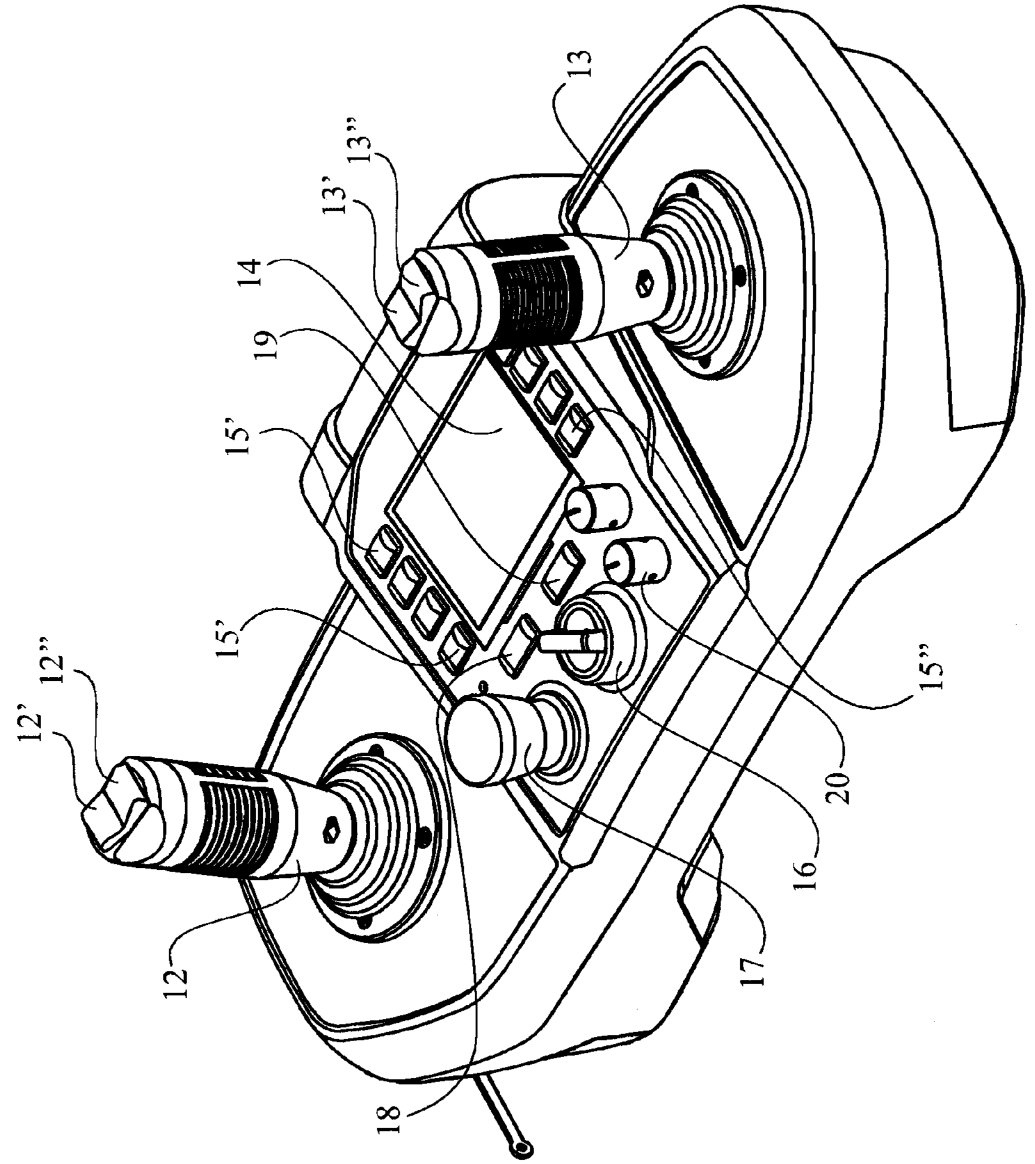
FIG. 3 is a top perspective view of a remote control as seen by the operator during working.
Figure 4:
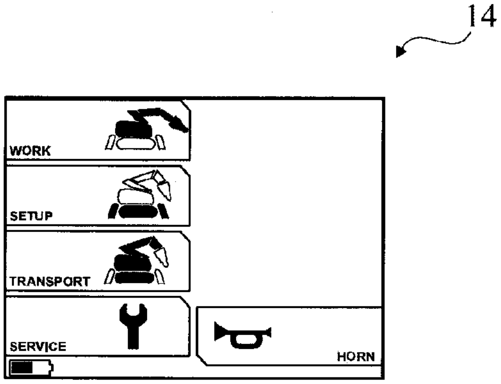
FIGS. 4 and 5 each show a summary of the function of the control sticks in the transport mode or position.
Figure 4:
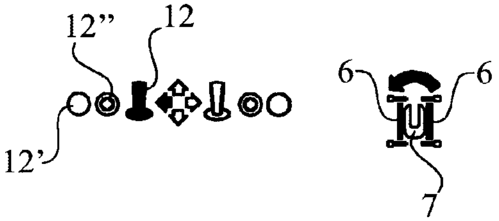
Figure 4:
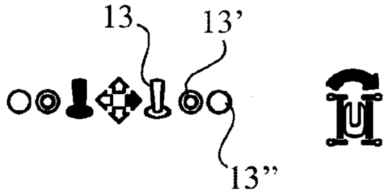
Figure 4:
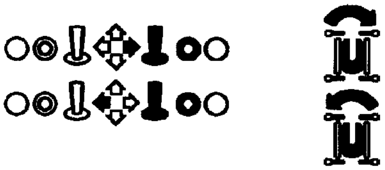
Figure 4:
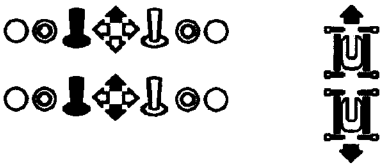
Figure 5:
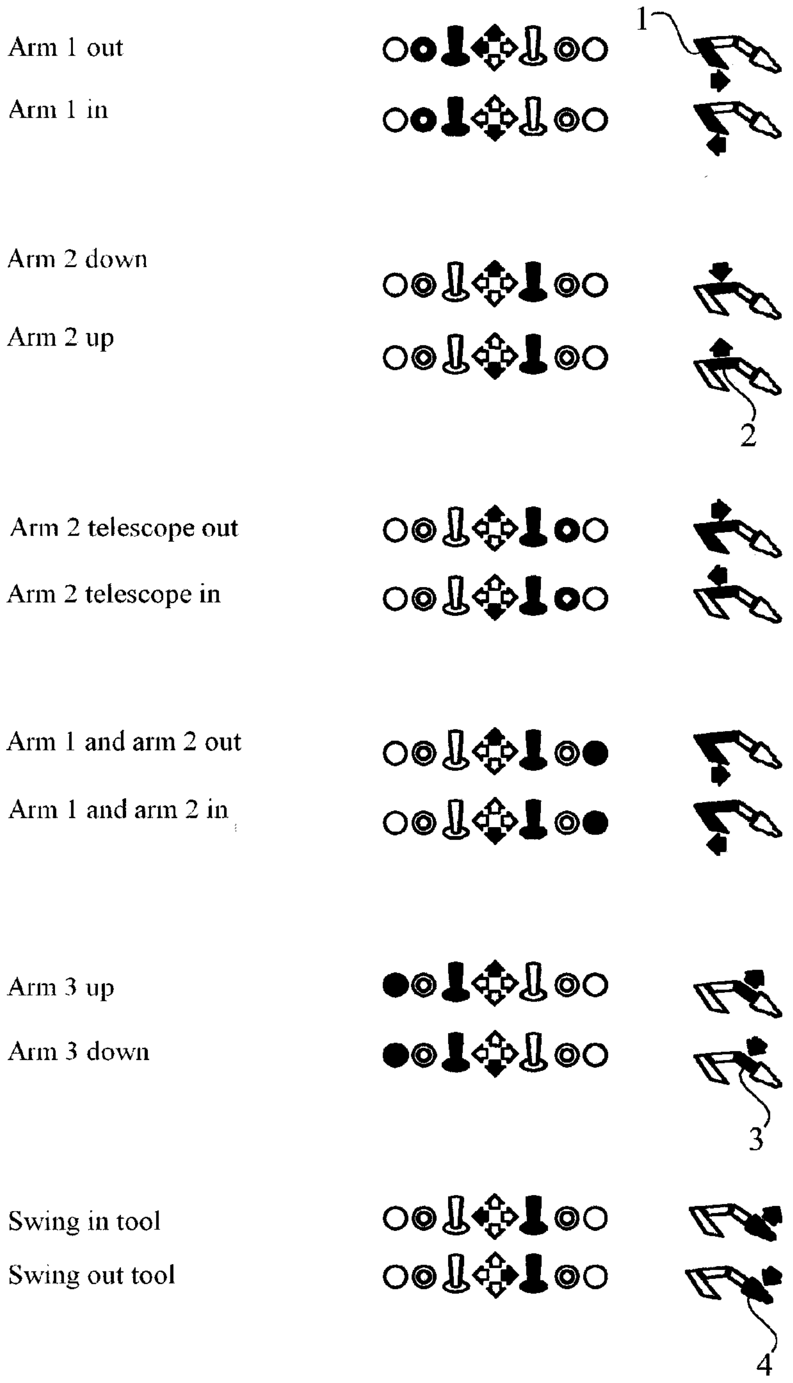

FIG. 3 shows the remote control 11 approximately as it is seen by the operator. It has a left control stick 12 provided with two control members, namely a left button 12' and a right button 12". In the same manner, the right stick has a left button 13' and a right button 13". The positioning of one button on the left and one button on the right at the top of the remote control is practical, but a number of other control member embodiments and positions are conceivable. E.g. the buttons could be replaced by slider or knob control members or lever control members with two or more positions. They could also be positioned on one side of the control stick, e.g. the front side, and controlled by means of one or two fingers. The remote control furthermore has a display 14 and a plurality of buttons, in this case four buttons 15' to the left of the display and four buttons 15" to the right of the display. The buttons 15' on the left have the function shown to their right on the display and the buttons 15" on the right have the function shown to their left on the display. This means that, when the machine is started, a plurality of modes or positions are shown on the display and the operator selects the position he wishes to use with the relevant button. In the example in FIG. 4, the operator has pressed the button 15' immediately to the left of transport so that this panel lights up on the display. The operator thus sees that the transport position or transport mode has been selected. The two control sticks thus have specific functions in this mode, as shown in FIGS. 4 and 5. In another mode such as set-up mode or work mode, the control sticks have different functions. All of the functions of the machine can thus be operated with relatively few control sticks and buttons. However, working modes may of course be produced in a different manner, e.g. a third smaller control stick could be positioned on the remote control and this control stick could be activated only in a specific mode, e.g. transport position. In principle, it is possible for there to be only one single mode and instead several control sticks and/or control members on the remote control. However, this would require a larger and heavier remote control, which is a disadvantage. However, even in the case of a remote control of this kind having a plurality of control members, it may be an advantage for it to have several modes so that certain control members are not active in certain modes. The concept of a mode can thus also have a slightly different meaning. The remote control furthermore has a main circuit breaker 16 and an emergency stop button 17. It moreover has a start button 18 and a stop button 19 for the motor. It furthermore has an LED which shows that the control sticks are active. However, the embodiment shown should be regarded only as one advantageous embodiment, with a large number of alternative embodiments being possible and advantageous. The knob 20 controls the flow rate of the hydraulic fluid, i.e. the working speed of the tool 4, and the knob above controls other movements in a corresponding manner.

As stated, FIGS. 4 and 5 show a special mode for the remote control, referred to as the transport mode or transport position. This mode is used when the machine is to be moved between two jobs. Its support legs 5 are then raised, approximately as shown in FIG. 1. One great advantage is that the machine can thus be driven using only one control stick. The two control sticks are shown in diagrammatic form in FIG. 4, the control members or in this case buttons of the control sticks being shown on the outside thereof. The four main directions of the control stick are furthermore shown between the control sticks. If a control stick is used, it is shown in grey, i.e. shaded, and its direction of rotation is also shown in grey/shaded. In the top example, only the left control stick 12 is shaded, as is an arrow pointing to the left. The example thus shows that when the left control stick 12 is moved to the left, the right caterpillar track is driven forwards and the left track is driven backwards. The small figures on the right show that the two caterpillar tracks 6 are active as they are shaded/grey, resulting in the dark arrow showing that the machine turns to the left. The next row shows what happens when the left control stick 12 is moved straight to the right (shaded right arrow). The right track is then driven backwards and the left track is driven forwards and the machine turns to the right on the spot. The fourth row in FIG. 4 shows that the left control stick is moved forwards, as a result of which both caterpillar tracks drive forwards and the machine goes straight forwards. Immediately below, it is shown that the left control stick is moved backwards so that both caterpillar tracks drive the machine straight backwards. If the control stick is moved in a diagonal direction, the aforementioned movements are combined so that the machine both turns and goes in a diagonal direction backwards or forwards. This means that the operator can control travel in the desired direction using only one control stick, in this case the left control stick 12. The speed of the caterpillar tracks is moreover proportional to the deviation of the control stick so that he can also control the speed of travel by means of one control stick. This simple speed operation is an advantage, but is not absolutely necessary. The speed could also be controlled in a different manner, e.g. by means of a separate knob. Overall, this means that, when operating the machine, the operator always has one hand, in this case the right hand, free for other tasks. E.g. he can straighten the power cable 8 so that it does not go under the machine or become entangled with other objects. As shown in FIGS. 4 and 5, he can also operate other functions with the aid of the right control stick. The third row in FIG. 4 shows how he can rotate the tower 7 clockwise or anti-clockwise by pressing the left button on the right control stick. In the small partial figures on the far right, the tower 7 is shaded/grey. It has a U-shape. The second row in FIG. 5 shows how he can swing arm 2 down or up by moving the right control stick forwards or backwards. The third row shows how he can move the telescopic part of arm 2 out or in by pressing the left control button. Row 4 shows how he can move arm 1 and arm 2 out or in by pressing the right button on the right control stick and moving the stick forwards or backwards. The bottom of FIG. 5 shows how he can swing the tool 4 in or out by turning the right control stick to the left or to the right. All of these operations with the right control stick can alter the geometry of the machine quite substantially so that the operator can thus alter the space occupied by the machine in different directions while moving the machine with the left control stick. This option of performing a plurality of functions while travel continues means that the travel time can be reduced quite substantially, thereby resulting in more efficient working. This is therefore a great efficiency advantage. By pressing the right button, it is possible to turn arm 1 (1) in or out by means of the left control stick, as will be clear from the top of FIG. 5. This interrupts travel, which is a disadvantage, but the operation can still take place in transport mode. This is nevertheless an advantage compared to the previously known Brock machine.

The invention claimed is:

1. A control system for a remote-controlled working machine provided with tracks, said control system comprising:

- a remote control, said remote control being coupled to at least one electronic unit in the machine, and having two control sticks and a number of buttons, levers and/or knobs for operating different travel and working functions of the machine, the machine has one or more different setting modes or positions, wherein the control sticks and/or certain buttons have different functions in different modes, the two control sticks each having at least two different setting modes or positions, so that each control stick performs at least two different functions of work or travel, and in a travel mode, travel of the machine is handled entirely by one of said two control stick, such that the tracks of the machine are operated as follows:
- if the one control stick is moved forwards or backwards, both tracks are driven forwards or backwards so that the machine moves forwards or backwards;
- if the one control stick is moved straight to the left, the right track is driven forwards and the left track is driven backwards so that the machine turns to the left;
- if the one control stick is moved straight to the right, the left track is driven forwards and the right track is driven backwards so that the machine turns to the right;
- if the one control stick is moved in a diagonal direction forwards or backwards and to the side, the abovementioned movements are combined so that the machine both turns and goes forwards or backwards in a diagonal direction.

2. The control system according to claim 1, in which the extent of the deviation of the one control stick from a center position determines how quickly the tracks are driven, such that a small deviation results in slow movement of the machine and a large deviation results in faster movement of the machine.

3. The control system according to claim 1, in which each control stick is provided with a first control member, also referred to as the left button, which, when activated, gives the control stick a different function from a basic function.

4. The control system according to claim 1, in which at least one control stick is provided with a second control member, also referred to as the right button, which, when activated, gives the control stick a third function different from a basic function and a first function.

5. The control system according to claim 4, in which at least one control stick is provided with a third control member and possibly a fourth control member which, when activated, give the control stick a fourth or possibly a fifth different function.

6. The control system according to claim 1, in which, at the same time as the machine is moved with the aid of one control stick, a series of other machine movements can be executed with the aid of the second control stick, alone or in combination with the action of the first control member or the second control member, including at least one of the following:

- rotating the tower of the machine clockwise or anti-clockwise;
- raising or lowering arm;
- extending or retracting a first arm;
- extending or retracting a second arm;
- swinging tools in or out.

7. A remote control intended to be carried by an operator situated beside a machine, the remote control comprising:

- two control sticks and a number of buttons, levers and/or knobs for operating the different travel and working functions of the machine having one or more different setting modes or positions;
- the control sticks and/or a plurality of the buttons have different functions in different modes;
- the two control sticks each having at least two different setting modes or positions, so that each control stick performs at least two different functions of work or travel, and in a travel mode, also referred to as a transport position, travel of the machine is handled entirely by one of the two control sticks, such that two tracks of the machine are operated as follows:
  - if the one control stick is moved forwards or backwards, both tracks are driven forwards or backwards so that the machine moves forwards or backwards;
  - if the one control stick is moved straight to the left, the right track is driven forwards and the left track is driven backwards so that the machine turns to the left;
  - if the one control stick is moved straight to the right, the left track is driven forwards and the right track is driven backwards so that the machine turns to the right;
  - if the one control stick is moved in a diagonal direction forwards or backwards and to the side, the abovementioned movements are combined so that the machine both turns and goes forwards or backwards in a diagonal direction.

8. A remote-controlled working machine provided with a control system according to claim 1.

9. The remote-controlled working machine according to claim 7, in which the working machine is a demolition robot having an arm consisting of at least three parts, an outer end of said arm furthermore being designed for attachment of a demolition tool.

10. The remote-controlled working machine according to claim 7, in which the machine has an electrically driven hydraulic pump with hydraulic fluid for operation thereof, and the machine is connected to the electrical supply by a power cable which then trails behind the machine during travel.

* * * * *